March 31, 1970   R. G. PARRISH   3,503,840
COMPOSITE CELLULAR CUSHIONING STRUCTURES
Filed April 24, 1968   2 Sheets-Sheet 1

OPEN CELL FOAM MATRIX
CLOSED CELL REINFORCING PARTICLE
VOID

| CODE | REINFORCEMENT |
|---|---|
| A { —— | POLYSTYRENE FOAM BEAD - BEFORE IMPACT |
|   { — — | "   "   " AFTER " |
| B { —·— | "   " FIBER BEFORE " |
|   { —··— | "   "   " AFTER " |
| C { ----- | RESILENT POLYESTER COIL BEFORE " |
|   { —··— | "   "   " AFTER " |

INVENTOR
ROBERT GUY PARRISH

ATTORNEY

March 31, 1970     R. G. PARRISH     3,503,840
COMPOSITE CELLULAR CUSHIONING STRUCTURES
Filed April 24, 1968     2 Sheets-Sheet 2

INVENTOR
ROBERT GUY PARRISH

BY *Don M. Kerr*

ATTORNEY

United States Patent Office 3,503,840
Patented Mar. 31, 1970

3,503,840
COMPOSITE CELLULAR CUSHIONING STRUCTURES
Robert Guy Parrish, Newark, Del., assignor to E. I. du Pont de Nemours and Company, Wilmington, Del., a corporation of Delaware
Continuation-in-part of abandoned application Ser. No. 559,838, June 23, 1966. This application Apr. 24, 1968, Ser. No. 723,823
Int. Cl. B32b 5/18
U.S. Cl. 161—159                      21 Claims

ABSTRACT OF THE DISCLOSURE

Cushioning structures composed of a resilient open-celled polymeric foam matrix and dispersed resilient reinforcing particles of closed-cell gas-inflated polymeric cellular material, said reinforcing particles having polyhedral-shaped cells defined by film-like cell walls less than two microns thick, said cells containing an inflatant.

RELATED APPLICATIONS

This application is a continuation-in-part of pending application Ser. No. 559,838, filed June 23, 1966, now abandoned.

BACKGROUND OF THE INVENTION

This invention is concerned with a resilient cushioning material. More particularly, it is concerned with a highly recoverable composite cushioning structure which exhibits good load support at low density, and which is comprised of resilient cellular polymeric components.

Cushioning structures ranging from "hard" e.g., carpet underlay, to "soft" e.g., mattresses and pillows, have heretofore been provided of diverse materials. In recent years resilient cellular structures of elastomeric polymers such as polyurethane and rubber foams have begun replacing various natural products previously used by virtue of their excellent performance and other favorable attributes. However, this replacement remains far from complete owing primarily to economic limitations. Thus the relatively expensive polyurethane and rubber products can compete with the relatively inexpensive natural (fibrous) cushioning products only by "diluting" the expensive polymers with air to form cellular structures. Since in general a cushioning structure functions by resiliently occupying a given volume, increasing the ratio of air/polymer results in a lower density, more economical structure. However, as the proportion of polymer decreases, the ability of the cushioning structure to support applied loads also decreases, and this establishes a practical limit on the amount of "air dilution" which is acceptable. This in turn establishes the minimum materials cost at which acceptable polyurethane or rubber foam cushioning structures can be made.

The prior art reveals a few attempts to improve the load support of low density resilient foams. Thus, one proposed solution incorporates metal coil springs as "reinforcing" elements, the springs being embedded in a matrix of the elastomeric foam. Unfortunately, this solution not only increases the cost of the structure but also leads to an undesirable increase in its over-all density as well as to mechanical damage of the matrix by the metal springs during flexing of the structure. Other attempts have ben made to improve the load support of low density resilient foams by incorporating various relatively stiff "filler" particles ranging in size and kind from microscopic inorganic clay particles to closed-cell foamed beads of polystyrene or even glass. Such structures do have an economic advantage in that the filler displaces an additional quantity of the relatively expensive elastomeric polymer at the same time it stiffens the structure. However, since the filler particles are relatively incompressible, the compressibility of such cushioning structures decreases abruptly when the compressed volume approaches the volume of the filler particles. This feature is termed "bottoming out" and describes a loss of cushioning ability under load. Obviously, this problem becomes more severe the higher the volume fraction of the reinforcing particles. The relatively light-weight foamed polystyrene reinforcing particles mentioned above do have the virtue of preserving the overall low density of the structure. However, if a certain critical load is ever once exceeded, such particles are crushed irreversibly, thus diminishing or even destroying the load-support contribution of the reinforcing particles, and in severe cases even impairing the ability of the cushioning structure to recover from deformation.

SUMMARY OF THE INVENTION

The present invention provides a resilient cushioning structure of low density having adequate load support. It further provides such structures which remain resilient under load i.e., do not "bottom out" prematurely, and which recover from repeated deformations. It also provides cushioning structures with a range of initial softness, or "plushness." These and other advantages will be apparent from the remainder of the specification and the claims.

The present invention achieves these advantages by providing a resilient cushioning structure comprised of cellular polymeric components, one component being a matrix of a resilient, open-celled foam and a second component comprising resilient reinforcing particles of closed-cell gas-inflated cellular material, which particles are dispersed in the matrix component, the volume fraction of the matrix component plus the volume fraction of the reinforcing particles being substantially 1.0. In a preferred embodiment the closed-cell reinforcing particles are distributed in a substantially contiguous, i.e. close but not necessarily touching, array throughout the cushioning structure. In another preferred embodiment the particles are filamentary particles. Additional preferred embodiments are described hereinbelow.

DETAILED DESCRIPTION

Figure 1:
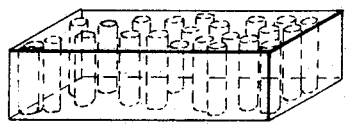
FIGURE 1 shows a product of the invention in which an array of parallelized filamentary reinforcing particles is embedded in an "on-end" configuration in an open-cell foam matrix.
Figure 2:
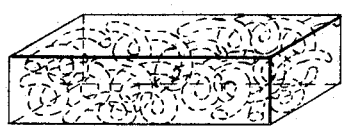
FIGURE 2 is an alternate and preferred structure wherein the filamentary reinforcing particles are coiled and the coil axes are approximately parallel to the major faces of the structure but are at random angles with respect to each other.
Figure 3:
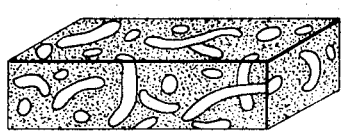
FIGURE 3 shows still another product of the invention but in this case the filamentary reinforcing particles have been arranged randomly therein and the structure has been sliced to provide a thin wafer-like sheet structure.
Figure 4:
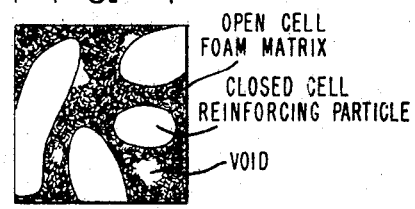
FIGURE 4 shows an enlarged view of a portion of the structure of FIGURE 3. The matrix cells and a small number of voids can be observed, however, the closed cells of the reinforcing particles are too small to be seen.

Unlike prior art reinforcing particles, the resilient particles of the present invention make a contribution to the compression curve of the structure throughout its whole range and do not result in premature "bottoming out" as would be observed on replacing a portion of the yieldable matrix with non-yieldable reinforcing particles. The matrix, in addition to making its own contribution to the compression curve (which contribution may be smaller in magnitude than the contribution of the reinforcing particles serves to maintain the reinforcing particles in their (predetermined) positions with respect to each other, to distribute externally applied loads over larger areas of the reinforcing particles than just their points of actual contact, to aid in recovery of the structure from deformations, and of course to unite the composite structure into a coherent unit.

The open-celled foam comprising the matrix is in the nature of a skeletal network of intercommunicating cells. The resiliency thereof is attributed essentially to the resiliency of the polymer in the network. A heavy load, rapidly applied to a sample of the matrix will quickly evacuate virtually all of the gas within the cells. The reinforcing particles, on the other hand, are composed of closed-cell, gas-inflated cellular material. Individual cells are pneumatic in the sense that gas molecules enter and exit only by the relatively slow process of diffusion through the cell walls. Hence, if a load is rapidly applied to a sample, compression will be resisted by the air within cells—the cells thus acting as miniature balloons.

The term "resilient" applied individually to the open-celled matrix and closed-cell reinforcing particles designates that each of these cellular components will along recover at least 95% within one minute from compression deformations of 50% sustained for 30 seconds, and furthermore that they will recover repeatedly from a series of such deformations. In the case of the reinforcing particles, the 50% compression deformation test is to be applied in a direction parallel to their smallest dimension, e.g. along a diameter for beads or along a diameter for fibers or rods (regardless of whether they are straight or curvilinear). A filament would thus be compressed to reduce its diameter—not its length.

The volume fraction of the matrix component plus the volume fraction of the reinforcing particles should be substantially 1.0, i.e. these two components essentially "fill" the cushioning structure. This may be tested by examining the surfaces of cross-sections cut through the structure. No more than a minor proportion of the area of the exposed surface may be "voids" in the matrix of a size equal to or larger than the average size of the exposed cross-sectional areas of the reinforcing particles. In the preferred structures the proportion of such voids (which are the result of imperfections introduced during generation of the matrix) will be less than 10%. When this condition is not satisfied, the reinforcing particles are not sufficiently "locked in place," external loads are not well distributed over large areas of the reinforcing particles, and the matrix-assisted recovery from deformation does not operate efficiently.

"Contiguous array" as used in describing the distribution of reinforcing particles in the preferred structures means a distribution of particles such that paths may be traced from numerous points on or near the principal load-bearing surface of the cushioning structure to its base, which paths traverse primarily only the reinforcing component. It is to be understood that these paths may be more or less tortuous in three dimensional space, and that "gaps" may be encountered between contiguous particles which are not in actual surface contact. In the preferred structures such paths will be relatively straight and aligned, e.g. parallel, with respect to the direction in which load is customarily applied to the cushioning structure, and any "gaps" which exist will be a small fraction (e.g. less than ¼) of the total path length. For example, if the reinforcing component is in the form of filamentary particles and these are aligned generally parallel to one another, then a load is desirably applied in a direction so as to tend to compress the filaments longitudinally. It is apparent that contiguous arrays provide maximum contribution to the load support by the reinforcing particles, and also that elongated particles (e.g. closed-cell foam filaments or staple of high length/diameter) offer the most efficient distribution of the reinforcing component.

The composite cushioning structures may be prepared by generating the open-cell matrix around the reinforcing closed-cell foam particles which thus become "encapsulated" and supported by the matrix. In the case of the preferred structures the reinforcing particles may be prepositioned and held in place at least until generation of the matrix has progressed sufficiently far to immobilize the particles.

Polymers suitable for preparing the open-celled flexible resilient matrix are well known in the art, and include for example both polyester and polyether urethanes, foam rubber, both natural and synthetic, (e.g. neoprene, styrene-butadiene rubber, and natural rubber, etc.). Open-celled polyurethane matrices are preferred since they may be prepared at very low densities and they exhibit particularly satisfactory adhesion to the reinforcing particles. The well known one-step polymerization/foaming technique is preferred, although prepolymer systems may also be employed providing the viscosity of the system is sufficiently low to permit the foam to flow around and surround the reinforcing closed-cell foam particles as the matrix is generated.

In order to produce the low density matrices which are preferred, it is generally advantageous to provide in the system an auxiliary blowing agent, such as certain low boiling halogenated hydrocarbons, as described in U.S. Patent 3,072,582. A flexible polyurethane matrix blown to a density of 2 lbs./cubic foot (0.032 g./cc.) or less will normally have an open-celled structure. However, if this is not the case, any of the well known techniques such as mechanical crushing, polymer degradation or partial solution techniques may be employed. Such open-celled structures, consisting of the generally polyhedral-shaped network of rod-like elements corresponding to the polymer residues at the intersections of the original cell walls, depend on the resiliency of the polymeric elements to provide recovery from deformation under external loads. Numerous examples of such cellular polyurethanes are well known in the art, see for example "Polyurethanes" chapter 5 by B. A. Dombrow, Reinhold Publishing Company.

The closed-cell resilient reinforcing particles are dispersed in the open-celled matrix. The reinforcing particles should have a maximum cross-sectional dimension no greater than about 1 inch (2.5 cm.), and diameters of approximately ¼ inch (0.6 cm.) or less are preferred, as are particles having a high ratio of length/diameter, e.g. being at least 3:1. Such elongated (filamentary) particles may be employed in either straight or curvilinear configuration. These particles must also be resilient and they should have low densities, i.e. no more than a few times (preferably less than 3×) that of the matrix, in order that the density of the cushioning structure not be inordinately increased by incorporation of the reinforcing particles into the matrix. The reinforcing particles should generally occupy at least 1% of the volume of the total structure to develop satisfactory cushioning properties.

The reinforcing particles should be a closed-cell, gas-inflated foam by which is meant that at least a majority of the cells are defined by a continuous thin polymeric membrane which confines a quantity of internal gas which is present at a pressure of at least about 1 atmosphere. For practical purposes mere visual or microscopic examination will often readily reveal whether a particular cellular structure predominates in closed or open cells. Otherwise the closed-cell content of a resilient sample may be determined by the gas displacement method of Remington & Pariser, "Rubber World," May 1958, p. 261, modified by operating at as low a pressure differential as possible to minimize volume changes of the yieldable pneumatic closed cells.

The entrapped gas in the closed cells of the reinforcing particles not only assists the particles to recover from deformations but also contributes to providing a modulus of compressibility which is larger than that of the surrounding low density open-celled resilient matrix component. For reasonable efficiency the modulus of the reinforcing particles should be at least 2×, and preferably at least 10×, that of the matrix. The distribution of the reinforcing particles may be deliberately nonuniform throughout the structure in order to provide nonuniform compression characteristics, when these are desirable.

Reinforcing particles exhibiting the foregoing characteristics are conveniently prepared from tough high-polymeric materials such as polyesters, polyamides, polyhydrocarbons, and various polar vinyl polymers by closed-cell foam generating techniques well known to one skilled in the art.

A desirable class of closed cell reinforcing particles comprises microcellular products having polyhedral cells defined by film-like walls less than two microns ($2 \times 10^{-4}$ cm.) thick, and wherein a quantity of impermeant gas is confined within each cell. By virtue of the semi-permeable nature of the walls, air from the external atmosphere diffuses into each cell until its internal fugacity rises to one atmosphere. Accordingly, the total pressure in each cell exceeds atmospheric pressure by an amount approximately equal to the partial pressure of the impermeant inflatant gas confined within the cells. Such super-inflated cellular particles are termed "turgid." Although these pneumatic particles may lose part of their gas content by slow outward diffusion of air under sustained external loading, on removal of the load an osmotic driving force will again cause air to diffuse back into the cells until the particle is reinflated to its original condition. The particle is thus fully recoverable as long as the cell walls remain intact and the impermeant inflatant is not lost. For purposes of this invention, an "impermeant" inflatant is one whose rate of diffusion out of the cells of the reinforcing particle into the atmosphere is so low that less than ½ of the inflatant is lost per year.

Elongated reinforcing particles provide not only the most efficient distribution of reinforcing component, but offer other advantages as well. Elongated cellular reinforcing particles exhibit an appreciable resistance to bending, which is enhanced in those of turgid character. In composite structures comprising such elongated particles, the initial load support of the low density matrix may therefore be reinforced by this resistance to bending of the reinforcing particles in addition to their resistance to compression. Bending motions of such reinforcing particles are restricted to some extent by the surrounding matrix, and recovery from deformation is complete due to the resilient character of the reinforcing particles and the matrix. It is clear that this desirable additional "bending" reinforcement will be operative for elongated reinforcing particles of diverse shapes, e.g. straight or bent rods, coiled springs, etc. It is equally apparent that certain elongated reinforcing particles, say in coil form, may be oriented in diverse directions within the matrix, even perpendicular to the direction of applied external force, and still make a substantial favorable contribution to reinforcing the resilient matrix.

Another property of the composite cushioning structures of this invention is an unexpected improvement in recovery from deformation. In addition to the cooperation between the components to produce the desired reinforcing effect and improved load support, it has been observed that recovery from deformation may be faster for the composite than it is for the reinforcing elements alone. When the components are examined individually, recovery of the open-celled matrix is essentially instantaneous. However, under sustained loads, a gradual outward diffusion of air occurs for the closed-cell reinforcing component. On release of load there occurs a rapid partial recovery followed by a slower complete recovery as air gradually diffuses back into the cells to fully reinflate the structure. However, full recovery of the composite structure is observed to be more rapid, and it is postulated that the encapsulated closed cell component is "pulled back" to its fully inflated configuration by the rapidly recovering surrounding matrix. While this may temporarily create an internal pressure less than one atmosphere in the closed cell component, this feature will aid and accelerate the rate at which air diffuses back into the cells to fully reinflate them. This unexpected feature even permits in some applications the use of reinforcing particles having no impermeant inflatant in their cells, the external mechanically assisted recovery provided by the matrix "substituting" for the osmotic pressure assisted recovery otherwise provided by any impermeant inflatant content of the cells. The surprising magnitude of this effect may result in part from the essentially continuous three-dimensional character of the resilient open-celled matrix.

The composite cushioning structures of this invention excel in many respects, including adequate load support at very low densities combined with high ratings on "comfort." "Comfort" appears to be a function of two principal parameters: plushness and dynamic modulus. "Plushness" is a measure of how far the structure yields under an applied load, e.g. how far the load "sinks into" the cushion. The structures of the present invention may be tailor-made to achieve the widely different degrees of plushness desirable for pillows, mattresses, carpet underlays, etc. by several means, including varying the volume fraction of reinforcing particles, varying the shape and orientation of the reinforcing particles, varying the distribution of reinforcing particles, etc. while still maintaining a desirable over-all low density. The dynamic modulus is determined by cycling the cushioning structure between two arbitrary loads. The dynamic modulus is calculated as the difference between the load limits divided by the difference in the fractional compression at these loads as observed on the tenth cycle. The load limits are chosen to be characteristic of the normal range of forces encountered in the particular end-use applications. For example, the load limits are chosen to be 1.0 and 1.5 p.s.i.g. (70 and 105 g./cm.²) for seat cushions, while for mattresses, the limits are chosen to be 0.5 and 0.8 p.s.i.g. (35 and 56 g./cm.²). Thus the lower the dynamic modulus, the more yielding (or comfortable) the cushion will be under sitting or lying loads. Since the reinforcing particles of the present invention are themselves resilient, the composite cushioning structures can be prepared with a very desirable low dynamic modulus (i.e. the cushion does not "bottom out" under load). It is particularly in a most favorable combination of plushness and low dynamic modulus that the structures of the present invention excel those of the prior art. These advantages will be further illustrated in the examples included hereinafter.

It is within the scope of this invention to include in the cushioning structures other components such as dyes, disinfectants, etc., whose volume fraction is too insignificant to affect the requirement that the volume fractions of the cellular matrix and reinforcing particles total substantially 1.0. For some applications, the low densities of the structures of this invention are desirable only for economy-of-materials cost, while the cushioning structure itself may be too light for optimum performance. Accordingly, it is contemplated that a cheap, inert heavy material (e.g. sand) may be adhered to the structure to provide a more desirable over-all weight.

The following examples are offered to further illustrate the invention, but are not to be construed as limiting it in any way.

Example I

Closed cell resilient reinforcing particles are prepared from polyethylene terephthalate by charging 405 g./min.

of dried polymer of relative viscosity 50 into an extruder. The polymer is melted and forwarded under pressure and mixed with methylene chloride supplied at 204 g./min. The solution thus prepared is discharged from the mixing section of the extruder at 223° C. and a pressure of 900 to 1000 p.s.i.g. (approximately 65 atm.) through a cylindrical orifice 15 mils diameter by 15 mils long (0.38 by 0.38 mm). On entering the atmospheric pressure region the superheated methylene chloride flashes off, thus generating a microcellular polyethylene terephthalate continuous filament. The cell walls of this polyhedral celled filament are less than 2 microns thick. Subsequent rapid diffusion of the methylene chloride vapor out of the closed cells leaves a substantially collapsed-cell filament. This filament is wound in a single helical layer of approximately ½" (12.7 mm.) pitch on ½" (12.7 mm.) diameter cylindrical mandrels and post-inflated by the following treatment. The fibers on the mandrels are placed in an autoclave approximately 13" in diameter by 18" long (33 cm. by 46 cm.) which is charged with 5 pounds (2.3 kgm.) perfluorocyclobutane and 5 pounds (2.3 kgm.) methylene chloride, closed and heated to 50° C. The methylene chloride/perfluorocyclobutane mixture is circulated and sprayed over the samples for 30 minutes after which they are transferred directly to a circulating air oven at 120° C. where they are held for 10 minutes. This treatment provides a fully inflated turgid closed cell sample set in helical coil form. The product density is approximately 1.5 pounds/cu. ft. (0.024 g./cc.) and the individual closed cells contain about 40 parts by weight of perfluorocyclobutane (impermeant inflatant) per 100 parts of polymer. These resilient closed-cell coiled reinforcing particles recover 98% from 50% compression applied parallel to the fiber diameter.

A composite cushioning structure is prepared by filling a 12 by 12 by 6" (30 by 30 by 15 cm.) mold with 32.3 g. of the reinforcing particles supplied as individual coils about 6" (15 cm.) long which are placed in layers with the coil axes approximately parallel to the bottom of the mold but at random angles with respect to each other. This provides a volume fraction of reinforcing particles of 0.096. The coils may be constrained to retain their position relative to each other by passing grids of nylon threads through the walls of the mold and through the coil assembly at approximately 2" (5 cm.) vertical intervals. Alternately, or in addition, a wire screen may be stretched across the top of the mold to confine the particles therein during generation of the matrix component. A polyurethane foam formulation according to Table IA is poured into the preheated (120° C.) mold and rises and surrounds the reinforcing particles. This method of construction therefore provides reinforcing particles in a contiguous array. After being cured 30 mins. at 120° C., the composite cushioning structure has a density of 0.89 lbs./cu. ft. (0.0142 g./cc.).

An 8½ x 8½ x 4" (22 x 22 x 10 cm.) specimen is cut from the composite cushion and tested with both 10 in.$^2$ (65 cm.$^2$) and 50 in.$^2$ (324 cm.$^2$) platens. (The shape of the load compression curve of a cushioning material depends on the ratio of the platen size to the cushion size.) The sample is then exercised to a 1.2 p.s.i. (84 g./cm.$^2$) load for 54,000 cycles at a rate of 8 cycles/minute and retested. Table IB contains properties before and after exercising for both the foam/foam composite cushion and a high quality, high density foam rubber standard of 3.8 lbs./ft.$^3$ [0.061 g./cc.]. These data show that the two materials have similar load compression curves both before and after exercising. Thus, the low density composites of this invention show the same properties and durability as foam rubber of much higher density.

TABLE IA

Polyurethane foam formulation

| Ingredient: | Parts by weight |
|---|---|
| Polypropylene ether polyglycol of number average molecular weight ~3000 and hydroxyl number of ~58.3. It is approximately trifunctional in hydroxyl groups, substantially all of which have been converted to primary hydroxyls | 100 |
| Siloxane-oxyalkylene copolymer (stabilizer) | 1.8 |
| Stannous octoate (catalyst) | 0.15 |
| Bis(2-dimethylaminoethyl)ether (catalyst) | 0.4 |
| Water | 4.6 |
| Fluorotrichloromethane (blowing agent) | 73.2 |
| 80/20 mixture of 2,4/2,6 tolylene diisocyanates | 58.5 |

TABLE IB.—COMPRESSION PROPERTIES BEFORE AND AFTER EXERCISING [1]

| Sample | Size of anvil [2] | State | Thickness (in.) (cm.) | Compression at 1.0 p.s.i. (70.3 g./cm.$^2$) (percent) | "RMA" [3] lbs./50 in.$^2$ (kg./127 cm.$^2$) | Dynamic modulus, 1.0-1.5 p.s.i. (70-105 g./cm.$^2$) |
|---|---|---|---|---|---|---|
| Coil-reinforced foam/foam composite=0.89 lb./ft.$^3$ (0.0142 g./cc.) | 10 in.$^2$ (65 cm.$^2$) | Before | 4.06 (10.5) | 27.8 | 45.5 | 10.5 |
| | | After | 3.77 (9.6) | 40.7 | 29.3 | 11.1 |
| Foam rubber standard=3.8 lb./ft.$^3$ (0.061 g./cc.) | 10 in.$^2$ (65 cm.$^2$) | Before | 4.00 (10.1) | 31.0 | 41.9 | 6.0 |
| | | After | 3.92 (9.9) | 45.6 | 30.6 | 7.1 |
| Coil-reinforced foam/foam composite | 50 in.$^2$ (324 cm.$^2$) | Before | 4.02 (10.2) | 53.2 | 20.5 | 15.5 |
| | | After | 3.74 (9.5) | 58.9 | 13.1 | 21.3 |
| Foam rubber standard | 50 in.$^2$ (324 cm.$^2$) | Before | 3.99 (10.1) | 67.0 | 18.9 | 15.3 |
| | | After | 3.94 (10.0) | 70.8 | 14.4 | 18.3 |

[1] 54,000 cycles at 1.2 p.s.i. load (84 g./cm.$^2$).
[2] Sample area=8½ x 8½" (22 x 22 cm.).
[3] Standard term used in the industry to denote one measure of firmness of cushions (cf. ASTM test D1564–58T, #29).

Example II

Two sets of composite cushioning structures are prepared to illustrate the alteration of their compression characteristics by increasing the volume percent of reinforcing particles.

The low density open-celled resilient polyurethane matrix component is prepared by standard techniques from the components listed in Table II. Proportions are chosen according to recipes A, B or C as indicated.

TABLE II

| | Parts by weight | | |
|---|---|---|---|
| | A | B | C |
| Polypropylene ether polyglycol of number average M.W.~3,000 and OH No. ~58.3. It is approximately trifunctional in secondary hydroxyl groups | 100 | 100 | 100 |
| Alkyl silane polyoxyalkylene copolymer | 0.7 | 0.7 | 0.7 |
| Stannous octoate (catalyst) | 0.4 | 0.5 | 0.4 |
| Triethylene diamine (catalyst) | 0.1 | 0.1 | 0.1 |
| Water | 3.5 | 3.5 | 3.5 |
| Diisocyanate (as in Example I) | 45.0 | 45.0 | 45.0 |
| Fluorotrichloromethane (blowing agent) | 15 | 22.5 | 0 |
| Cream time (sec.) | | 3 | 6 |
| Rise time (sec.) | | | 144 |
| Density: | | | |
| lbs./ft.$^3$ | 1.38 | 1.0 | 1.9 |
| G./cc. | 0.02 | 0.016 | 0.03 |

The closed-celled resilient reinforcing component is prepared in fiber form as follows: A 1 liter pressure vessel is charged with 440 g. of polyethylene terephthalate (dried 6 hours under vacuum at 206° C. followed by 16 hours under a dry nitrogen bleed) and 290 ml. methylene chloride (dried over calcium hydride). The vessel is closed, heated to 219° C., rotated 30 minutes end-over-end to insure good mixing and solution, positioned vertically and held for 10 minutes, and pressurized with nitrogen gas to 900 p.s.i.g. (about 61 atm.) just prior to extruding the solution through a cylindrical orifice 30 mils (0.75 mm.) diameter by 60 mils (1.5 mm.) long located at the lower extremity of the vessel, and preceded by a 50 mesh filter screen. The superheated methylene chloride flashes off when the solution leaves the orifice, generating a microcellular fiber with closed cells whose walls are less than 2 microns thick. These fibers are exposed in a closed system to a 50/50 vol. (liquid) mixture of methylene chloride/perfluorocyclobutane heated to about 80° C. to introduce into the closed cells about 40 parts of perfluorocyclobutane per 100 parts of polymer, which gas thereafter performs as an impermeant inflatant. The fibers are fully inflated by a subsequent 1 hr. heat treatment in air at 150° C. The density of these fibers is 1.15 lbs./cu. ft. (0.0185 g./cc.) and their diameter is approximately 3/16″ (4.8 mm.). These fibers recover at least 95% from 50% compression held for 30 seconds.

Figure 5:
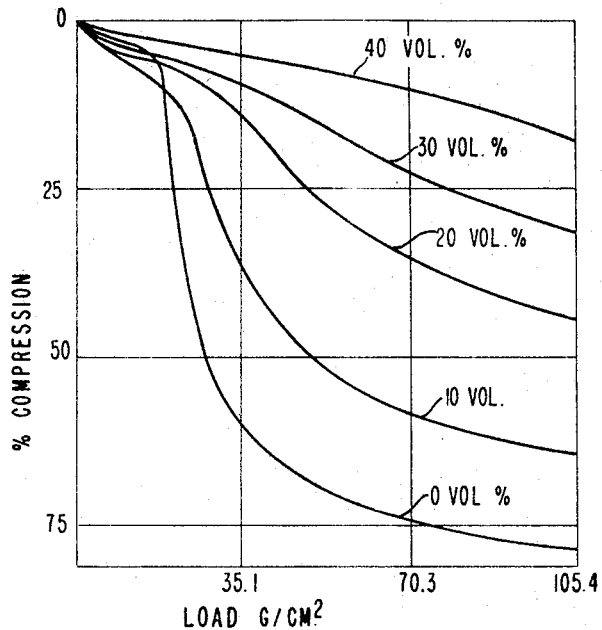

One set of composite cushioning structures is prepared by filling open molds with these reinforcing fibers in the form of random batts, packed to various densities, i.e. various volume fractions. In order to help immobilize these low density fibers during matrix foam generation, these batts are lightly coated with a rubber latex and cured at 120° C. for 1 hr. Polyurethane cream prepared according to Recipe A of Table II is poured into the molds and allowed to rise through these batts to form composite cushioning structures, all at approximately the same over-all density of about 1.7 lb./cu. ft. (0.0272 g./cc.) but with different volume fractions of reinforcing component. The resilient matrix foam occupies substantially all of the complementary volume fraction. These samples are cured one hour at 120° C., and then compression curves are determined as indicated in FIGURE 5. These data are obtained at 1″ (2.5 cm.) compression per minute on samples 3 inches (7.6 cm.) thick and approximately 30 square inches (194 cm.$^2$) surface area. As is readily apparent, increasing the volume percent of the reinforcing particles increases the load support of the cushioning structure, all at approximately constant over-all density. Thus the plushness (e.g. percent compression at 1 p.s.i.g.) may be varied over a wire range by choosing the appropriate volume percent of resilient reinforcing particles. The dynamic modulus (70 to 105 g./cm.$^2$) is determined to be 29, 21, 13, 12 and 14 p.s.i. (2.0, 1.5, 0.91, 0.84 and 0.98 kgm./cm.) per fractional compression for reinforcing particles contents of 0, 10 20, 30 and 40 volume percent respectively, i.e. the compliance under sitting loads increases as the volume percent of reinforcing particles increases.

Figure 6:
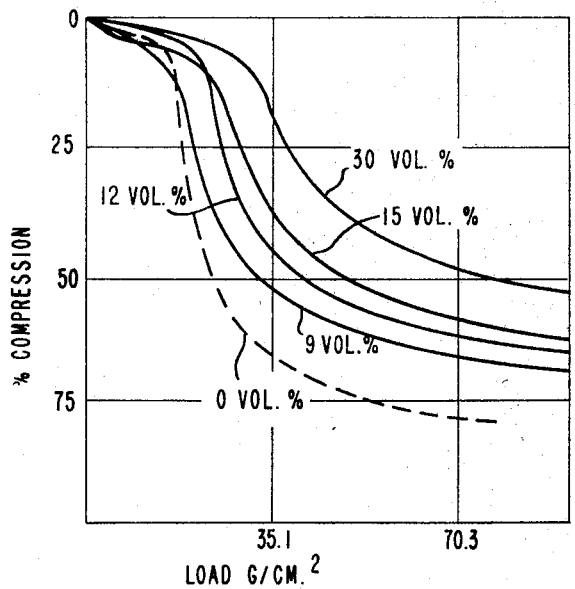

A second set of composite cushions containing various volume percentages of reinforcing closed cell foam fibers is prepared with a different ararngement of the reinforcing fibers. A set of increasing quantities of polyethylene terephthalate microcellular fibers of density 1 lb./cu. ft. (0.016 g./cc.) and dimaeter 75 mils (1.9 mm.) is prepared as random batts of equal area but increasing thicknesses. These batts are each compressed to ½″ (1.2 cm.) thickness and coated with sufficient rubber latex to stabilize their compressed shape. These ½″ (1.2 cm.) thick batts now constitute a graduated set of increasing volume percent (closed cell fibers). Next, each batt is paired with a separate mold which is then filled with a parallel array of ½″ (1.2 cm.) thick rectangular wafers cut from the batts, the wafers standing on edge and being spaced ¾″ (1.9 cm.) center-to-center. Although each mold now contains an equal number of wafers, the volume percent fibers in the several molds is of course proportional to the volume percent fibers in the compressed batts. A polyurethane cream prepared according to recipe B of Table II is poured into each mold and rises through and around the reinforcing fiber batts while generating the open cell matrix component. Each composite cushion in the resulting set has a density of approximately 1.4 lbs./cu. ft. (0.022 g./cc.). A separate unreinforced polyurethane matrix is also prepared from recipe B, excepting only that the fluorocarbon blowing agent is reduced to 15 parts to produce an open celled foam of density 1.4 lbs./cu. ft. (0.022 g./cc.). The compression curve (load applied parallel to the planes of the imbedded wafers) shown in FIGURE 6 again indicates increased load support as the volume percent of reinforcing particles is increased. The dynamic modulus (1.0 to 1.5 p.s.i.g.) (70 to 105 g./cm.$^2$) of these cushions is determined to be 27, 21, 18, 16 and 14 p.s.i. (2.0, 1.5, 1.3, 1.1, and 0.98 kgm./cm.$^2$) per fractional compression for reinforcing particles contents of 0, 9, 12, 15 and 30 volume percent respectively, i.e. the compliance under sitting loads increases as the volume percent of reinforcing particles increases. Prior art fibrous cushioning materials such as cotton, sisal, synthetic fiber batts, etc. intended for seat cushions are normally available with compressions from approximately 20–65% under a 1 p.s.i.g load (70 g./cm.$^2$), but the dynamic modulus is (undesirably) of the order of 40 p.s.i.g. (2.81 kgm./cm.$^2$) per fractional compression and higher.

Example III

This example illustrates two points: the advantages gained by using resilient reinforcing particles and the effect on the reinforcing action of changing the shape of the reinforcing particles.

A polyurethane foam is prepared as follows. A mixture of 100 parts by weight of a 3000 molecular weight polypropylene glycol triol, 3.66 parts of water, 0.10 part of triethylene diamine, 0.40 part of stannous octoate, 0.20 part of N-methyl morpholine, and 1.00 part of a silicone glycol polymer ("Dow Corning 199") is stirred for 10 seconds. Then 44 parts by weight of a mixture of 80 parts of 2,4-tolylene diisocyanate and 20 parts of 2,6-tolylene diisocyanate is added, and stirring continued for a further 7 seconds. The mixture is then poured into a mold where it foams up and gels giving a resilient open-pored foam of density 2.02 lbs./cu. ft. (0.032 g./cc.). This is labeled Sample R.

Composite samples A and B are prepared as above except that 18 weight percent of expandable polystyrene beads and 10 weight percent of expandable polystyrene staple fibers (approximately 1″ long) are added to the polyurethane ingredients. The exothermic heat of reaction of the polyurethane formation converts the expandable polystyrene particles into closed-cell reinforcing particles which occupy 29 and 16 volume percent respectively of samples A and B. The density of these reinforcing particles is computed from the ratio of expanded to initial dimensions to be 0.0168 and 0.0184 g./cc. for the beads and the fibers respectively. The density of composite samples A and B is 2.34 and 2.39 lbs./cu. ft. (0.0375 and 0.0383 g./cc.) respectively. As is evident from the percent compression and RMA data in Table III, the elongated (fiber) reinforcing particles are much more efficient than the spherical (bead) particles since they contribute approximately equal reinforcing action (e.g. large decrease of percent compression at 1 p.s.i. (70 g./cm.$^2$) and large increase in RMA) at about ½ the volume fraction of reinforcing particles.

Figure 7:
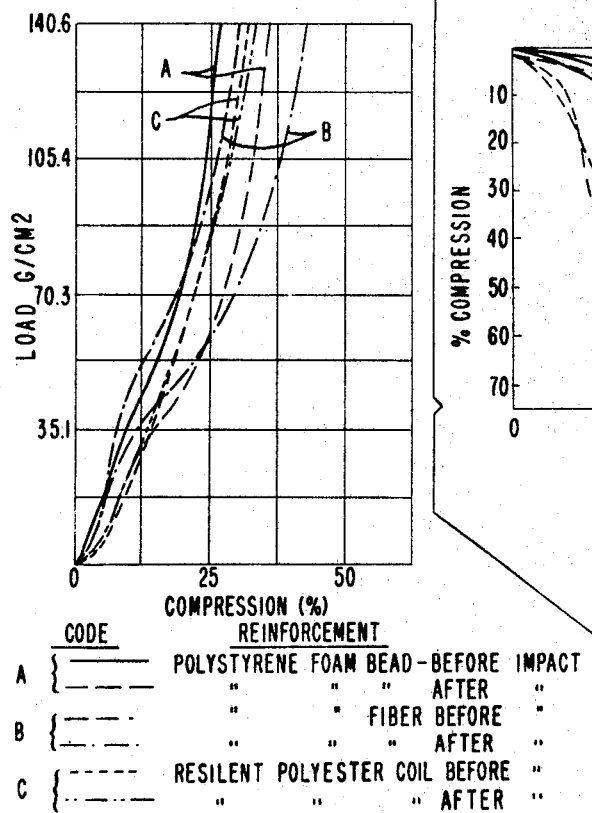
FIGURES 5–8 show compression curves for various products within and without the present invention. They will be described in connection with the specific examples to which they pertain.

Both the polystyrene expanded beads and fibers fail to pass the "resiliency" requirement of the present invention since particles dissected out of samples A and B recover only 78 and 61% from 50% compressions. To illustrate the criticality of this defect these samples are subjected to an arbitrary test comprising a single impact produced by dropping a 20 lb. (9.1 kgm.) weight of 20 sq. in. (129 cm.$^2$) surface area from a 20″ (51 cm.) height onto the surface of the sample. These conditions were chosen to approximate the impact produced by a small child jumping on a mattress or chair seat cushion. The data in Table III and the compression curves in FIGURE 7 illustrate the severe loss in load support experienced by the nonresilient polystyrene foam reinforced samples after only one such impact cycle. For comparison purposes data are also given in Table III and FIGURE 7 for sample C illustrating the durability of the resilient composite cushioning structures of the present invention. Sample C is very similar to the product of Example I, but it has an over-all density of 1.33 lbs./cu. ft. (0.0213 g./cc.) and is prepared using resilient foam fiber coiled reinforcing particles of density 0.030 g./cc. at a volume fraction of 0.15 (which particles recover 99% in the resiliency test). Sample C, which withstands the impact test essentially unchanged, was selected as having similar compression properties to those of Samples A and B. However, all other composite cushioning structures comprising resilient components as required by the present invention have also passed the impact test with no, or only very minor, loss of cushioning ability.

ene terephthalate fiber is 20%, the over-all density is 1.5 lb./cu. ft. (0.024 g./cc.), and the composite samples are sliced perpendicular to the axis of the reinforcing fibers to produce wafers or sheets of approximately ½" (1.3 cm.) thickness in accordance with the thickness normally employed in commercial carpet underlay materials. One of these composite samples is prepared with reinforcing pneumatic cellular filaments of diameter 0.280" (7.1 mm.) and the other two have filaments of diameter 0.170" (4.3 mm.) and 0.030" (0.76 mm.) (filaments oriented perpendicular to the surface and occupying 20 volume percent). The performance of these samples is compared to that of various commercial underlay materials in a simulated use test wherein a static load of 25 p.s.i.g. (1.76 kg./cm.$^2$) is applied for a period of 17 hours,

TABLE III

| Sample | Density (lb./ft.$^3$) (g./cc.) | Reinforcing particles | | | | Initial properties | | Properties after impact | |
|---|---|---|---|---|---|---|---|---|---|
| | | Shape | Density (g./cc.) | Resilience, percent | Volume fraction | Percent Comp. at 1 p.s.i. (70 g./cm.$^2$) | RMA | Percent Comp. at 1 p.s.i. (70.3 g./cm.$^2$) | RMA |
| R | 2.02 (0.032) | | | | | 65 | 26 | | |
| A | 2.34 (0.038) | ¼" bead (0.6 cm.) | 0.0168 | 78 | 0.29 | 20 | 77 | 28 | 41 |
| B | 2.39 (0.038) | 1" fiber stapel (2.5 cm.) | 0.0184 | 61 | 0.16 | 18.5 | 68 | 30 | 36.5 |
| C | 1.33 (0.021) | ½" diam. coil (1.27 cm.) | 0.030 | 99 | 0.15 | 22.5 | 59.5 | 22.5 | 59 |

Example IV

This example illustrates the large effects made possible by using elongated reinforcing closed cell particles in nonrandom arry.

Figure 8:
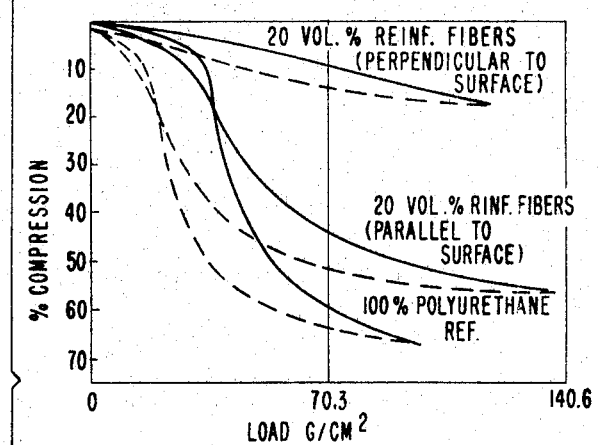

A quantity of polyethylene terephthalate pneumatic microcellular reinforcing fibers is prepared by a procedure similar to that in Example II. The post-inflated pneumatic resilient fibers, which are ⅛" (3 mm.) in diameter and have a density of 0.96 lb./ft.$^3$ (0.0154 g./cc.) are suported from a wire screen grid in the form of numerous closely spaced, grossly elongated loops so that, except for the ends of the loops, the fibers are in an approximately parallel array, e.g. a large scale looped-pile structure. A quantity of polyurethane foam is generated according to recipe C of Table II to form a matrix around this oriented array of fibers such that the composite cushioning structure contains approximately 20 volume percent of the pneumatic cellular reinforcing fibers. A separate reference sample of the open-celled polyurethane matrix is prepared without any reinforcing particles. The over-all density of both reinforced and reference samples is approximately 2 lb./cu. ft. (0.032 g./cc.) Compression curves, shown in FIGURE 8, are again determined on 3" (8.6 cm.) thick portions of these samples having a cross-sectional area of approximately 30 square inches (194 cm.$^2$). The pronounced anisotropy of the oriented reinforced composite structure is readily apparent on comparing the compression curves for samples prepared with the reinforcing fibers oriented "parallel" and "perpendicular" to the direction of the applied force. The preferred structures, when the greatest degree of reinforcing is desired, are those having contiguous arrays comprising elongated reinforcing elements parallel to the direction of the applied force. The degree of reinforcement of the 20 volume percent random batt in the composite structure of Example II lies, as would be expected, between "parallel" and "perpendicular" samples of this example, particularly when aprpopriate allowance is made for the slight difference in over-all density.

Example V

For carpet underlay, where relatively firm cushioning is desirable, elongated reinforcing particles which are oriented perpendicular to the surface of the structure may be employed. Three such composite cushioning structures are prepared, as in Example IV, except that the volume percent of the reinforcing pneumatic polyethyl- the initial compression and percent recovery 5 minutes after removal of load are determined.

TABLE IV.—CARPET UNDERLAY MATERIALS

| Sample | Density (lbs./ft.$^3$) (g./cc.) | Percent Compression at 25 p.s.i.g. (1.76 kg./cm.$^2$) | Recovery (percent), 5 min. after removal of load |
|---|---|---|---|
| Composite structures of this invention: | | | |
| A—0.280" fiber (0.71 cm.) | 1.5 (0.024) | 60 | 86 |
| B—0.170" fiber (0.43 cm.) | 1.5 (0.024) | 85 | 95 |
| C—0.030" fiber (0.076 cm.) | 1.5 (0.024) | 88 | 94 |
| Representative commercial materials: | | | |
| Foam rubber | 9.1 (0.15) | 78 | 88 |
| Rippled foam rubber | 12.5 (0.20) | 75 | 98 |
| Rubberized hair felt | 8.8 (0.14) | 45 | 69 |
| Polyurethane | 3.0 (0.048) | 91 | 94 |

Additional tests wherein these samples are installed under carpets in heavily traveled corridors also indicate excellent durability under the cyclical loads of walking traffic.

These data indicate that even at very low densities, the composite structures of this invention show excellent recovery from load, and further that the degree of firmness may be varied over the range from hair felt (firm) to polyurethane foam (soft) by simply altering the diameter of the reinforcing elements. It is also possible, as the data in the preceding examples show, to alter the firmness by changing the volume percent of a given sized reinforcing element, or by altering the distribution or orientation of the filaments in the structure.

Example VI

Additional composite cushioning carpet underlays are prepared by the following process. An open-celled styrene-butadiene rubber (SBR) foam is prepared by mixing 450 parts of a 50% solids commercial latex masterbatch with 13 parts of an accelerator masterbatch (both from Chris-Craft Industries, Trenton, N.J.), plus 13 parts of 50% zinc oxide and 9 parts of 25% sodium silico fluoride in a laboratory scale Oakes mixer. The output from the mixer is delivered into the bowl of a Hobart mixer mounted over the inlet to a Moyno pump (Robbins & Meyers Manufacturing Co.). Resilient closed-cell foam reinforcing particles are also delivered from a storage bin via vibrator feeding device into the mixer bowl where the ingredients are blended by the wire ball beater of the Hobart mixer before they pass into the Moyno pump.

These reinforcing particles comprise pneumatic closed-cell polyethylene terephthalate fibers prepared by a process similar to that employed in Example II and they have a density of about 1.3 lbs./ft.$^3$ (including about 15 weight percent of perfluorocyclobutane impermeant inflatant inside the cells) and a diameter of about 70 mils, and have been chopped into short length "staple" particles. The Moyno pump delivers the blended foam mixture to the surface of a conveyor which passes under a ¼" x 2" aluminum bar doctor blade to control the thickness of the deposit. The resulting products are cured in an air oven at about 150° C. for a period of about one hour.

In Run A, where no reinforcing particles are added, the density of the cured 100% SBR foam is about 17.5 lbs./ft.$^3$. In Run B, ¼" long polyethylene terephthalate foam "staple" particles are blended in about 1:1 volume ratio with the wet SBR foam, and the bed of the conveyor covered with a nonwoven scrim of Reemay® spunbonded polyester which is about 10 mils thick at a basis weight of about 1.4 oz./yd.$^2$ upon which is deposited the blended foam doctored to a thickness of 0.295". The cured composite has a density of about 8 lbs./ft.$^3$ and the Reemay® scrim is firmly adhered to the composite cushioning structure where it contributes higher tensile and tear strength to the underlay product. In Run C, ⅛" long "staple" particles are blended in about a 15:21 ratio by volume (staple particles: SBR foam) and the mixture doctored at a thickness of 0.225" onto the back of a commercial contract grade tufted carpet whose tufts have previously been locked in place with a light latex coating as normally practiced, but to which no secondary backing had been applied. After being cured, the product is an integral foam-backed carpet since the composite foam cushion underlay becomes bonded to the carpet. Although the performance of this foam backed carpet is excellent, the exposed surface of the underlay is "dimpled" since the SBR matrix foam shrinks slightly during curing to leave the reinforcing particles extending slightly beyond the "mean" surface of the underlay. This feature is considered by some people to be aesthetically unattractive. Accordingly, in Run D a layer of 100% SBR foam approximately 80 mils thick is doctored onto the dimpled surface of the product of Run C which, after curing, yields a smooth surfaced underlay of total thickness about 0.235". In Run E, the foam blend of Run C is cast in a rectangular mold and cured. The resulting composite foam block is sliced into ½" thick sheets (density of about 7.7 lbs./ft.$^3$) which are glued with latex to the back of a carpet to form a product similar to that of Run C.

In a similar experiment, polyethylene terephthalate foam fibers of diameter approximately 0.31" and density of 0.018 g./cc. inflated with 29 weight percent of perfluorocyclobutane are cut to approximately 0.30" long "staple" and mixed with a 50% solids latex whipped to a wet density of approximately 19 lbs./ft.$^3$. The mixture is spread on the back of a contract-type carpet without a secondary backing to a thickness of about ⅓". The reinforcing particles are thus "one layer deep" and the latex foam matrix fills the spaces between the particles. A backing scrim of tobacco cheesecloth is placed on the surface of the composite foam layer, and the scrim-foam-carpet sandwich is cured at about 145° C. for about 15 minutes. The basis weight of the carpet component is 53 oz./yd.$^2$, of the foam composite 42.3 oz./yd.$^2$ (of which 2.3 oz./yd.$^2$ represents reinforcing particles), and the scrim 0.8 oz./yd.$^2$. The thicknesses of the latter two layers are 0.30" and 10 mils respectively in the final cured product.

It is, of course, possible to vary the average foam density as well as the compression characteristics of the composite underlay by altering the volume percent of the reinforcing particles. Also, various types of scrim backings may be employed, both woven, e.g. burlap, cheesecloth, etc., and nonwoven, e.g., spunbonded sheets or crossed warp sheets. Similarly, both woven and tufted carpets of natural or synthetic fibers may be employed for the laminates of this example.

Example VII

A composite cushioning structure is prepared from an open-celled rubber matrix and isotactic polypropylene closed cell reinforcing fibers.

The open-celled rubber foam matrix is prepared as follows:

| Ingredient | Conc., percent | Parts by weight Dry | Parts by weight Wet |
|---|---|---|---|
| (1) Foamtol BGL-9002 [1] | 58 | 107.3 | 185.0 |
| (2) Dispersion FV-2003 [2] | 53 | 12.9 | 24.4 |
| (3) Potassium Oleate solvent | 20 | 3.0 | 15.0 |
| (4) FC-128 [3] solution | 5 | 0.5 | 10.0 |
| (5) Vulcarite-X304 [4] dispersion | 10 | 0.7 | 7.0 |
| (6) Dispersion FZ-3005 [5] | 51 | 6.4 | 12.6 |
| (7) Dispersion FG-4001 [6] | 52.5 | 31.5 | 60.0 |

[1] Alco Oil and Chemcial Corp.'s 70/30 blend of natural rubber latex and styrene-butadiene latex.
[2] Alco Oil and Chemical Corp.'s curing dispersion comprised of sulfur plus a standard accelerator.
[3] Minn. Min. and Manufacturing's anionic fluorocarbon surfactant.
[4] Alco Oil and Chemical Corp.'s accelerator dispersion.
[5] Alco Oil and Chemical Corp.'s zinc oxide dispersion.
[6] Alco Oil and Chemical Corp.'s sodium silicofluoride dispersion.

Ingredients 1 through 5 are mixed with vigorous starting, and the mixture allowed to mature overnight with a slow speed stirring. Subsequently, the mixture is beaten at high speed until the desired foam density is reached, the beating speed reduced, and ingredient 6 added slowly. After one minutes' additional heating, ingredient 7 is added slowly. Mixing at medium speed is continued for 30 seconds and then at low speed for one minute. The foam poured promptly into a mold (coated with a release agent containing the reinforcing fibers to insure good encapsulation before gelation occurs. Subsequently the foam is cured in an air oven 1½ hours at 120° C., washed with water, squeezed and dried.

The isotactic polypropylene microcellular reinforcing fibers are prepared with a 2" (5 cm.) extruder having independently driven metering and mixing screws. Isotactic polypropylene at 210 g./minute is melted and mixed to form a 53.5% solution in a composite solvent nucleating agent system of 80% methylene chloride, 20% perfluorocyclobutane, ⅓% silica aerogel and ⅓% butanol. The solution is heated to 152° C. and extruded through a spinneret having 9 holes each 18 mills (0.45 mm.) diameter by 90 mils (2.2 mm.) long at a pressure of approximately 1200 p.s.i.g. (approximately 82 atm.). The resulting 122 mils (3 mm.) diameter fibers have a density of 0.014 g./cc. with about 4 weight percent perfluorocyclobutane inflatant entrapped in the closed cells. A random batt of these continuous filaments is lightly bonded with a latex adhesive and placed in the mold described above so as to occupy 10 volume percent.

Compression properties, as determined by ASTM test D-1564-62T, are compared for the reinforced sample and 100% foam rubber samples of various densities in Table V. The 100% volume rubber samples show the normal decrease in load cell fibers shows a load support at densities, while the composite sample reinforced with the resilient closed cell fibers shows a load support at least equivalent to the 5.2 lbs./cu. ft. (0.083 g./cc.) reference sample at only ⅔ its density without any objectional increase in dynamic modulus.

TABLE V.—PHYSICAL PROPERTIES OF FOAM RUBBER CUSHIONING STRUCTURES

| Total density (lb./ft.$^3$) (g./cc.) | Percent reinforcing fibers (by volume) | 25% ILD* (lb.) | Dynamic modulus 1-1.5 p.s.i. (70-105 g./cm.$^2$) | Dynamic modulus 0.5-0.8 p.s.i (35-56 g./cm.$^2$) |
|---|---|---|---|---|
| 5.2 (0.083) | | 37.0 | 11.8 | 7.23 |
| 4.2 (0.067) | | 24.7 | 11.5 | 5.74 |
| 3.8 (0.061) | | 18.0 | 12.4 | 4.68 |
| 3.5 (0.056) | 10 | 38.0 | 12.8 | 7.54 |

*Indentation load deflection.

Other open-celled foam rubber matrix formulations, such as those given on page 21 of the Vanderbilt Latex Handbook, edited by George G. Winspear, R. K. Vanderbilt Co., Inc., copyright 1954, may also be employed to form the matrix component of this invention. As mentioned before, low density matrices are particularly preferred, and these may be prepared by techniques well known in the art, such as suitable control of the beating operation, addition of surface active agents (potassium oleate), etc.

I claim:

1. A cushioning structure comprising a cellular polymeric matrix of a resilient open-celled foam and dispersed therein, in an amount providing at least 1% of the volume of said structure, resilient reinforcing particles of closed-cell gas-inflated organic polymeric cellular material, the volume fraction of said matrix and said particles in the structure being substantially 1.0, said closed-cell gas-inflated organic polymeric cellular material having polyhedral-shaped cells defined by film-like cell walls less than two microns thick, said cells containing an inflatant.

2. A cushioning structure according to claim 1 wherein said particles are arranged in a substantially contiguous array throughout the cushioning structure.

3. A cushioning structure according to claim 1 wherein the particles are filamentary particles.

4. A cushioning structure according to claim 3 wherein said filamentary particles are helically coiled filamentary particles.

5. A cushioning structure according to claim 3 wherein said filamentary particles are randomly aligned.

6. A cushioning structure according to claim 3 wherein said filamentary particles are aligned in substantially the same direction.

7. A cushioning structure of claim 3 wherein the particles have polyhedral-shaped cells defined by film-like cell walls less than two microns thick which cells contain an impermeant inflatant.

8. A cushioning structure of claim 1 wherein the particles are composed of polyethylene terephthalate.

9. A cushioning structure of claim 7 wherein the particles are composed of polyethylene terephthalate.

10. An integral foam-backed carpet in which the foam backing is a cushioning structure as defined in claim 1.

11. An integral foam-backed carpet of claim 10 in which the reinforcing particles of the cushioning structure have polyhedral-shaped cells defined by film-like cell walls less than two microns thick which cells contain an impermeant inflatant.

12. An integral foam-backed carpet of claim 11 in which the reinforcing particles are composed of polyethylene terephthalate.

13. An integral foam-backed carpet of claim 10 having a reinforcing fibrous sheet bonded to its bottom surface.

14. An integral foam-backed carpet of claim 10 having a thin layer of polymeric foam bonded to the surface of the cushioning structure opposite the carpet layer.

15. A carpet underlay comprising a cushioning structure as defined in claim 1 integrally bonded to a reinforcing fibrous sheet.

16. A carpet underlay of claim 15 wherein the reinforcing particles of the cushioning structure have polyhedral-shaped cells defined by film-like cell walls less than two microns thick which cells contain an impermeant inflatant.

17. A carpet underlay of claim 16 wherein the particles are composed of polyethylene terephthalate.

18. A carpet underlay of claim 15 having a thin layer of polymeric foam bonded to the surface of the cushioning structure opposite the reinforcing fibrous sheet.

19. A carpet underlay of claim 15 wherein the particles have diameters substantially equal to the thickness of the underlay and lengths at least equal to their diameters.

20. A carpet underlay of claim 15 wherein the matrix of the cushioning structure is a styrene-butadiene rubber.

21. A cushioning structure according to claim 1 wherein said inflatant is impermeant to said cell walls.

References Cited

UNITED STATES PATENTS

| | | | |
|---|---|---|---|
| 2,819,993 | 1/1958 | Gregory | 260—2.5 X |
| 2,950,221 | 8/1960 | Bauer et al. | 161—67 X |
| 3,106,507 | 10/1963 | Richmond | 161—178 X |
| 3,227,574 | 1/1966 | Mohr | 161—66 X |
| 3,277,026 | 10/1966 | Newnham et al. | |
| 3,300,421 | 1/1967 | Merriman et al. | |
| 3,332,828 | 7/1967 | Faria et al. | 161—66 X |
| 3,344,221 | 9/1967 | Moody et al. | 161—159 |

ROBERT F. BURNETT, Primary Examiner

LINDA M. CARLIN, Assistant Examiner

U.S. Cl. X.R.

5—361; 161—67, 165, 170